(12) United States Patent
Jain

(10) Patent No.: US 9,729,245 B2
(45) Date of Patent: Aug. 8, 2017

(54) USING ARTIFICIAL JUSTIFICATIONS TO APPLY NOISE SHAPING TO ACTUAL JUSTIFICATIONS ASSOCIATED WITH MAPPING CLIENT DATA

(71) Applicant: Infinera Corporation, Sunnyvale, CA (US)

(72) Inventor: Ashok Jain, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/715,724

(22) Filed: May 19, 2015

(65) Prior Publication Data

US 2016/0330014 A1 Nov. 10, 2016

(30) Foreign Application Priority Data

May 6, 2015 (IN) ............................ 2296/CHE/2015

(51) Int. Cl.
| | |
|---|---|
| *H04L 5/22* | (2006.01) |
| *H04L 7/00* | (2006.01) |
| *H04B 10/548* | (2013.01) |
| *H04J 3/16* | (2006.01) |
| *H04J 3/07* | (2006.01) |

(52) U.S. Cl.
CPC .............. *H04B 10/548* (2013.01); *H04J 3/07* (2013.01); *H04J 3/1652* (2013.01)

(58) Field of Classification Search
USPC ........................................................ 398/188
See application file for complete search history.

(56) References Cited

U.S. PATENT DOCUMENTS

| 8,494,363 B2 | 7/2013 | Calderon et al. | |
|---|---|---|---|
| 2002/0186719 A1* | 12/2002 | Subrahmanyan | H04J 3/076 370/506 |
| 2004/0156325 A1* | 8/2004 | Perkins | H04J 3/07 370/299 |

(Continued)

OTHER PUBLICATIONS

Finochietto, "Transport of Client Protocols," http://lcd.efn.uncor.edu/pdf/clientmapping.pdf, 2012, 35 pages.
EXAR Corporation, "Generic Mapping Procedure," http://www.exar.com/uploadedfiles/products/communications/exar_gmp_wp.pdf, Sep. 2011, 6 pages.
Whitehead, "OTN—What is it and Why is it Important?" http://acronet.at/acronet/images/Transport/OTN_ER1101_EMEA.pdf, Jun. 19, 2014, 8 pages.

(Continued)

*Primary Examiner* — Oommen Jacob
(74) *Attorney, Agent, or Firm* — Harrity & Harrity LLP; David L. Soltz

(57) ABSTRACT

A transmitter may receive client data, associated with a client rate, to be mapped to frames associated with a server rate. The transmitter may generate justifications associated with the mapping of the client data to the frames. The transmitter may create, based on the justifications, artificial justifications that include information associated with justifications created to shape phase variations present in a recovered client clock associated with the client rate. The phase variations may be shaped based on the artificial justifications to cause shaped phase variations to be present in the recovered client clock. The shaped phase variations may include phase variations that can be filtered from the recovered client clock. The transmitter may map the client data to the frames based on the artificial justifications to cause the shaped phase variations to be present in the recovered client clock.

19 Claims, 9 Drawing Sheets

242 →

(56) References Cited

U.S. PATENT DOCUMENTS

| | | | | |
|---|---|---|---|---|
| 2005/0074032 A1* | 4/2005 | Surek | ............... | H04J 3/1611 370/503 |
| 2007/0071033 A1* | 3/2007 | Surek | ............... | H04J 3/1611 370/474 |
| 2007/0110059 A1* | 5/2007 | Spires | ............... | H04J 3/076 370/389 |
| 2012/0144059 A1* | 6/2012 | Wander | ............ | H04J 3/1658 709/233 |
| 2012/0155476 A1* | 6/2012 | Pavani | ............ | H04J 3/0658 370/400 |
| 2015/0016578 A1* | 1/2015 | Bruckman | ......... | H04J 3/0623 375/354 |
| 2016/0330014 A1* | 11/2016 | Jain | ................ | H04B 10/548 |

OTHER PUBLICATIONS

Whitehead, "OTN—What is it and How does it Work?" http://acronet.at/acronet/images/Transport/OTN_ER2100_EMEA.pdf, Jul. 7, 2014, 16 pages.

Gorsche, "A Tutorial on ITU-T G.709 Optical Transport Networks (OTN)," http://www.elettronicanews.it/01NET/Photo_Library/775/PMC_OTN_pdf.pdf, 2010, 78 pages.

EXAR Corporation, "Recent Features of OTN (G.709)," http://www.exar.com/uploadedfiles/products/communications/recent_features_otn.pdf, May 2011, 8 pages.

International Telecommunication Union, "Recommendation ITU-T G.709/Y.1331," http://www.itu.int/rec/T-REC-G.709-201202-I/en, Feb. 2012, 238 pages.

* cited by examiner

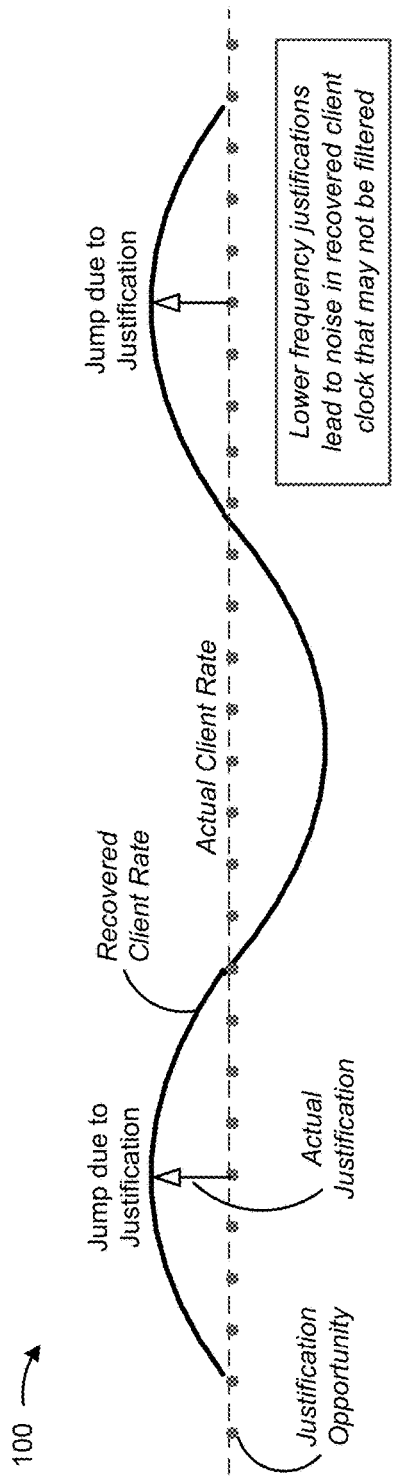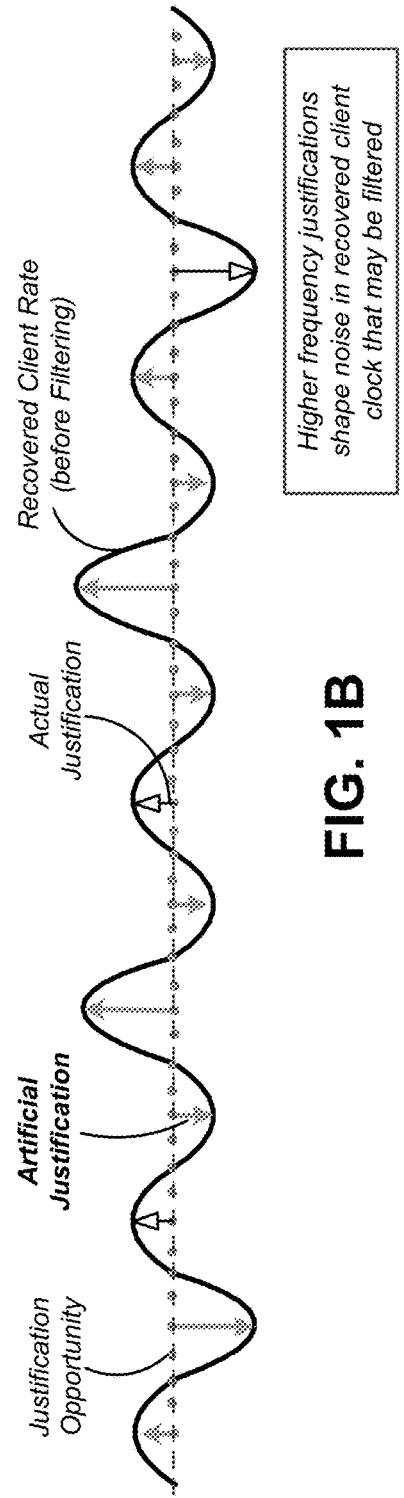
FIG. 1A
FIG. 1B

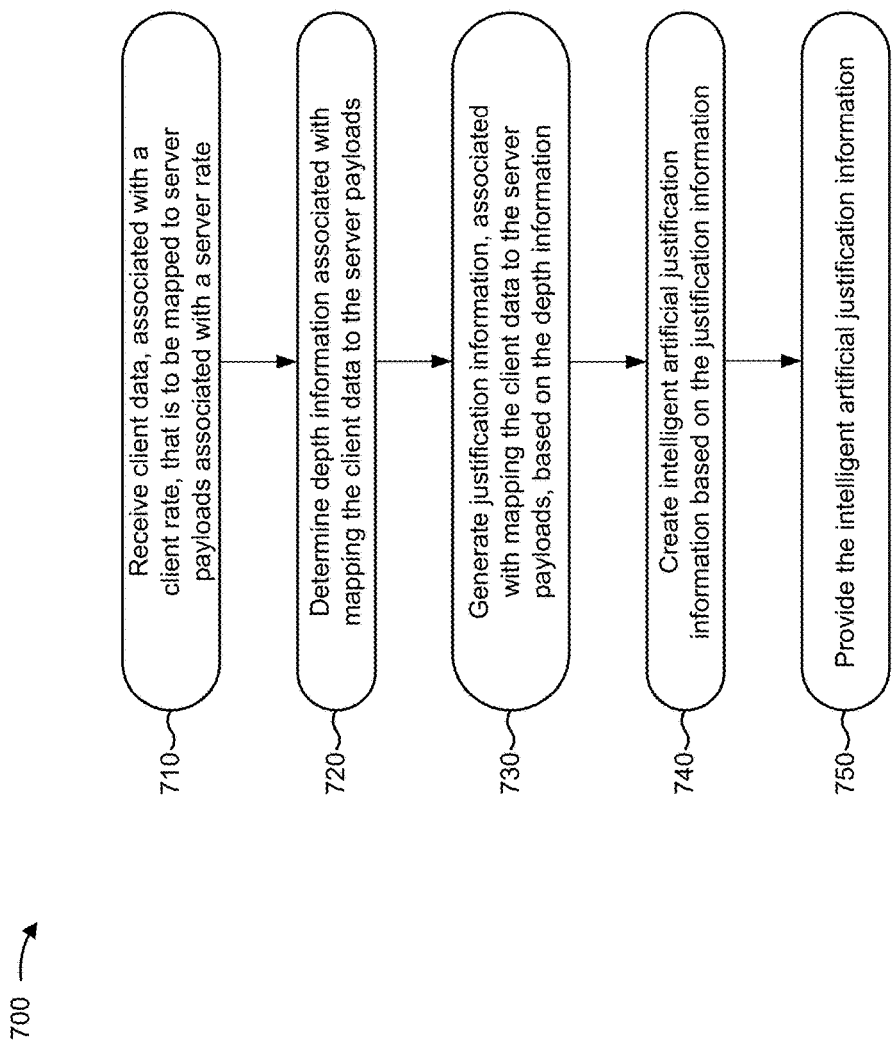

USING ARTIFICIAL JUSTIFICATIONS TO APPLY NOISE SHAPING TO ACTUAL JUSTIFICATIONS ASSOCIATED WITH MAPPING CLIENT DATA

RELATED APPLICATIONS

This application claims priority under 35 U.S.C. §119 based on Indian Provisional Application No. 2296/CHE/2015, filed May 6, 2015 the disclosure of which is incorporated herein by reference.

BACKGROUND

An Optical Transport Network (OTN) is defined by ITU-T as a set of optical elements that are connected by optical links and that are capable of providing transporting, multiplexing, switching, management, supervision functionality, and survivability of optical channels carrying client signals.

An OTN uses digital wrapper technology that provides a method for encapsulating data in an optical data unit. Generally, digital wrapping involves grouping a number of existing optical data units together into one entity that can be more efficiently managed with a small allocation of overhead and forward error correction (FEC) bytes. There are multiple levels of hierarchy for encapsulation, including an Optical channel Payload Unit (OPU) for encapsulation of client data, an Optical channel Data Unit (ODU) for encapsulating the OPU data, an Optical channel Transport Unit (OTU) for encapsulating the ODU data.

SUMMARY

According to some possible implementations, an optical transmitter may comprise one or more components configured to: receive client data, associated with a client rate, to be mapped to frames associated with a server rate; generate justifications associated with the mapping of the client data to the frames, where the justifications may include information associated with one or more justifications; create artificial justifications based on the justifications, where the artificial justifications may include information associated with one or more justifications created to shape phase variations present in a recovered client clock associated with the client rate, where the phase variations may be shaped based on the artificial justifications to cause shaped phase variations to be present in the recovered client clock, and where the shaped phase variations may include phase variations that can be filtered from the recovered client clock; and map the client data to the frames based on the artificial justifications to cause the shaped phase variations to be present in the recovered client clock.

According to some possible implementations, a system may comprise a transmitter configured to: receive client data, associated with a client rate, to be mapped to frames associated with a server rate; generate justifications associated with the mapping of the client data to the frames, where the justifications may include information associated with one or more justifications; create artificial justifications based on the justifications, where the artificial justifications may include information associated with a set of justifications created to shape phase variations present in a recovered client clock, where the recovered client clock may be associated with the client rate, and where the phase variations may have an associated frequency spectrum that is shaped based on the artificial justifications; and map the client data to the frames based on the artificial justifications to cause shaped phase variations to be present in the recovered client clock, where the shaped phase variations may include phase variations that can be filtered from the recovered client clock.

According to some possible implementations, a method may comprise: receiving, by a digital signal processor (DSP), client data, associated with a client rate, to be mapped to frames associated with a server rate; generating, by the DSP, a set of actual justifications associated with the mapping of the client data to the frames; creating, by the DSP, a set of artificial justifications based on the set of justifications, where the set of artificial justifications may include information associated with one or more justifications created to shape a frequency spectrum of phase variations in a recovered client clock associated with the client rate, where the phase variations may be caused by the set of actual justifications, where the frequency spectrum of the phase variations may be shaped by the set of artificial justifications to cause shaped phase variations to be present in the recovered client clock, and where the shaped phase variations may include phase variations that can be filtered from the recovered client clock; and mapping, by the DSP, the client data to the frames based on the set of artificial justifications to cause the shaped phase variations to be present in the recovered client clock.

BRIEF DESCRIPTION OF THE DRAWINGS

FIGS. 1A and 1B are diagrams of an overview of an example implementation described herein;

FIG. 7 is a flow chart of an example process for creating intelligent artificial justifications in order to apply noise shaping to actual justifications associated with mapping client data, associated with a client rate, to frames associated with a server rate.

DETAILED DESCRIPTION

Figure 2:
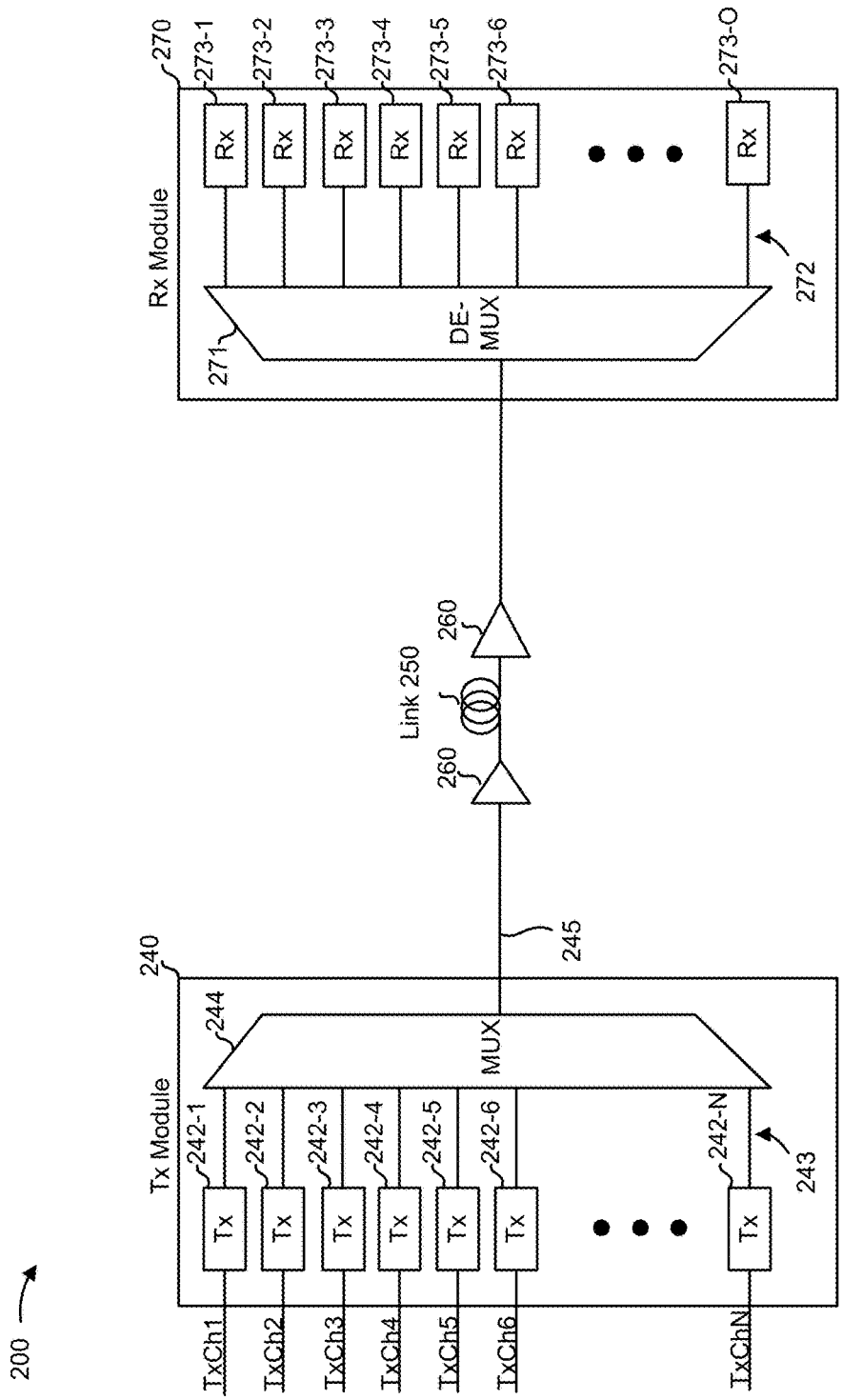
FIG. 2 is a diagram of an example network in which systems and/or methods, described herein, may be implemented.

The following detailed description of example implementations refers to the accompanying drawings. The same reference numbers in different drawings may identify the same or similar elements.

In a network, such as a telecommunications network, a common mapping technique is asynchronous mapping. Asynchronous mapping may allow client data, associated with a client rate, to be adapted to a frame (e.g., including an overhead area and a payload area, associated with a server rate, by virtue of using justifications when the client rate and the server rate are asynchronous and/or independent. Asynchronous mapping procedure (AMP) and generic mapping procedure (GMP) are two examples of such asynchronous mapping techniques. For example, client data for a constant bit rate (CBR) client rate, such as CBR10G, may be mapped into OPU2 (e.g., using AMP). As another example, client data for an Ethernet client rate, such as 40 Gigabit Ethernet (GbE) may be mapped into OPU3 (e.g., using GMP). In some cases, both the client and the server may have equivalent nominal bit rates, but each rate may have a tolerance (e.g., a ±20 parts per million (ppm) bit rate tolerance, a ±45 ppm bit rate tolerance, a ±100 ppm bit rate tolerance, etc.) such that the rates may not be equal.

As a result, at a given time, the client rate may be faster than the server rate, equal to the server rate, or slower than the server rate. In order to accommodate such potential rate differences, the asynchronous mapping technique may use justifications that increase or decrease an amount of client data included in a frame and/or an amount of stuffing included in the frame (e.g., in order provide more client data or less client data in the frame).

With regard to AMP, if the client rate is slower than the server rate, then one or more negative justification opportunity (NJO) bytes (e.g., included in an overhead portion of a frame carrying a payload) will not carry client data, and one or more positive justification opportunity (PJO) bytes (e.g., included in the payload portion of the frame) will periodically not carry client data. Similarly, if the client rate is faster than the server rate, then the one or more PJO bytes will carry client data and the one or more NJO bytes will periodically carry client data. In each frame, a justification control (JC) portion of the overhead may indicate usage of the NJO and PJO bytes for the frame.

With regard to GMP, the difference between the client rate and the server rate may be accounted for by applying a justification in the form of varying a distribution of the client data with respect to stuffing in the frame (e.g., based on a sigma-delta modulation as described by the OTN G.709 standard). In each frame, the JC portion of the overhead may communicate residual data information, such as information associated with the amount of client data included in the frame, information associated with client data remaining in a buffer, or the like, in order to improve clock recovery.

However, because justifications may be used rarely (e.g., with AMP or GMP), a recovered client clock may have low frequency phase variations (i.e., noise) with respect to the actual client rate (e.g., due to quantization error). For example, the rare use of the justifications, such as once every 100 frames, once every 1000 frames, or the like, may cause the low frequency phase variations in the recovered client clock. Moreover, filtering low noise variations may be difficult. As such, an amount of jitter and/or wander (i.e., jitter with a frequency that is less than approximately 10 hertz (Hz)) may be present in the recovered client clock, and a client rate, associated with the recovered client clock, may oscillate around the actual client rate (e.g., which may lead to buffer overflow and/or underflow associated with providing the client data at another end in the network).

Implementations described herein may allow phase variations, introduced by justifications used to map client data (e.g., associated with a client rate) into frames (e.g., associated with a server rate), to be noise shaped to such that the phase variations of a recovered client clock may be filtered in order to reduce an amount of jitter and/or wander in the recovered client clock (e.g., to improve accuracy of a recovered client rate). The description herein will use terms like "client" and "server" and these terms are intended to merely differentiate one rate from another, one clock from another, etc., and may be substituted with other terms, such as "first" and "second", "client side" and "line side," or the like.

FIGS. 1A and 1B are diagrams of an overview of an example implementation 100 described herein. For the purposes of example implementation 100, assume that client data, associated with a client rate, is mapped to frames associated with a server rate. Further, assume that the client rate and the server rate are independent (e.g., such that the client rate may not be the same as the server rate), and that an asynchronous mapping technique (e.g., AMP, GMP, etc.) is used to generate justifications associated with adapting the client rate to the server rate. Finally, assume that a client clock, associated with the client rate, is to be recovered based on the client data included in the frames (e.g., such that a client rate may be recovered based on the recovered client clock).

FIG. 1A shows an example of how the recovered client rate may oscillate around the actual client rate due to low frequency phase variations caused by rarely using justifications to map the client data into the frames. As shown in FIG. 1A, assume that actual justifications are rarely applied (e.g., once every 100 frames, once every 1000 frames, etc.) with respect to an amount of justification opportunities (e.g., where each justification opportunity may correspond to a different frame). As shown, due to the rare use of the justifications, a recovered client rate (e.g., determined based on a client clock recovered from the frames) may oscillate around the actual client rate. Such rare use of justifications may result in low frequency phase variations in the recovered clock (e.g., that may be difficult to filter). As shown, since the phase variations may not be filtered, the recovered client rate may oscillate around the actual client rate.

FIG. 1B shows an example approximation of how the recovered client rate may oscillate around the actual client rate based on adding intelligent artificial justifications (herein referred to as "artificial justifications" or "intelligent artificial justifications") when mapping the client data into the frames. As shown in FIG. 1B, assume that actual justifications are rarely applied with respect to an amount of justification opportunities. As further shown, intelligent artificial justifications (e.g., determined based on the actual justifications) may be inserted into one or more frames. In other words, phase variations introduced by the justifications associated with mapping the client data (herein referred to as actual justifications) may be noise shaped based on intelligent artificial justifications such that the phase variations, introduced by the actual justifications are at a higher frequency due to the introduction of the intelligent artificial justifications. Here, the higher frequency phase variations can be easily filtered (e.g., in a phase-locked loop (PLL) associated with recovering the client clock). As shown, before filtering of the higher frequency phase variations (e.g., at an optical receiver that receives the frames), the recovered client rate may oscillate more frequently due to the intelligent artificial justifications. However, such higher frequency phase variations may be easily filtered (e.g., as compared to the low frequency phase variations) to improve accuracy of the recovered clock. As such, use of intelligent artificial justifications to noise shape noise introduced by the actual justifications may allow the recovered client rate to be approximately equal to the actual client rate (e.g., rather than oscillating around the actual client rate by a substantial amount, an amplitude of the variations may be reduced).

In this way, intelligent artificial justifications may be used to shape the quantization noise, introduced by actual justifications associated with mapping client data (e.g., associated with a client rate) into server frames (e.g., associated with a server rate), such that the noise in a recovered client clock may be filtered to reduce an amount of jitter and/or wander in the recovered client clock (e.g., and to improve accuracy of a recovered client rate).

FIG. 2 is a diagram of an example devices of an optical network 200 that may be designed, monitored, and/or configured according to implementations described herein. One or more devices of FIG. 2 may operate within optical network 200. As shown in FIG. 2, optical network 200 may include transmitter module 240 (e.g., a Tx PIC) and/or receiver module 270 (e.g., an Rx PIC). In some implementations, transmitter module 240 may be optically connected to receiver module 270 via link 250 and/or optical amplifiers 260. One or more optical amplifiers 260 may amplify an optical signal as the optical signal is transmitted over link 250.

Transmitter module 240 may include a number of optical transmitters 242-1 through 242-N (N≥1), waveguides 243, and/or optical multiplexer 244. Each optical transmitter 242 may receive a data channel (TxCh1 through TxChN), may modulate the data channel with an optical signal, and may transmit the data channel as an optical signal. In some implementations, transmitter module 240 may include 5, 10, 20, 50, 100, or some other number of optical transmitters 242. Each optical transmitter 242 may be tuned to use an optical carrier of a designated wavelength.

Waveguides 243 may include optical links to transmit modulated outputs (referred to as "signal channels") of optical transmitters 242. In some implementations, each optical transmitter 242 may connect to one waveguide 243 or to multiple waveguides 243 to transmit signal channels of optical transmitters 242 to optical multiplexer 244. In some implementations, waveguides 243 may be made from a birefringent material and/or some other material.

Optical multiplexer 244 may include an arrayed waveguide grating (AWG) or some other multiplexing device. In some implementations, optical multiplexer 244 may combine multiple signal channels, associated with optical transmitters 242, into a wave division multiplexed (WDM) signal, such as optical signal 245.

As further shown in FIG. 2, receiver module 270 may include optical demultiplexer 271, waveguides 272, and/or optical receivers 273-1 through 273-O (O≥1). In some implementations, optical demultiplexer 271 may include an AWG or some other demultiplexing device. Optical demultiplexer 271 may supply multiple signal channels based on a received WDM signal (e.g., optical signal 245). As shown in FIG. 2, optical demultiplexer 271 may supply signal channels to optical receivers 273 via waveguides 272.

Waveguides 272 may include optical links to transmit outputs of optical demultiplexer 271 to optical receivers 273. In some implementations, each optical receiver 273 may receive outputs via a single waveguide 272 or via multiple waveguides 272. In some implementations, waveguides 272 may be made from a birefringent material and/or some other kind of material.

Optical receivers 273 may each operate to convert an input optical signal to an electrical signal that represents the transmitted data. In some implementations, optical receivers 273 may each include one or more photodetectors and/or related devices to receive respective input optical signals outputted by optical demultiplexer 271 and a local oscillator, convert the signals to a photocurrent, and provide a voltage output to function as an electrical signal representation of the original input signal.

The number and arrangement of devices and networks shown in FIG. 2 are provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, or alternatively, one or more of the devices of optical network 200 may perform one or more functions described as being performed by another one or more of the devices of optical network 200.

Figure 3:
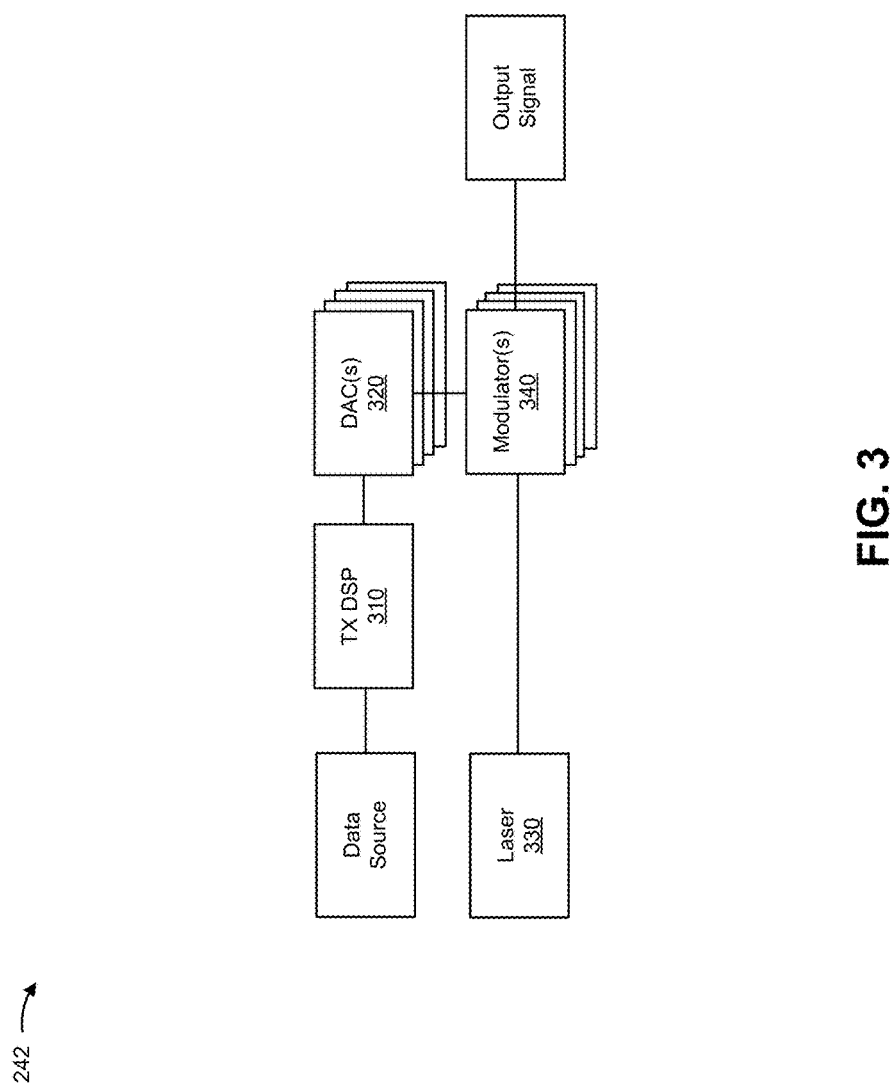
FIG. 3 is a diagram of example components of an optical transmitter shown in FIG. 2.

FIG. 3 is a diagram of example components of optical transmitter 242 shown in network 200 of FIG. 2. As shown in FIG. 3, optical transmitter 242 may include a Tx digital signal processor (DSP) 310, one or more digital to analog converters (DACs) 320, a laser 330, and one or more modulators 340. In some implementations, Tx DSP 310, DACs 320, laser 330, and/or modulators 340 may be implemented on one or more integrated circuits, such as one or more photonic integrated circuits (PICs), one or more application specific integrated circuits (ASICs), or the like. In some implementations, components of multiple optical transmitters 242 may be implemented on a single integrated circuit, such as a single PIC, to form a super-channel transmitter.

Tx DSP 310 may include a digital signal processor or a collection of digital signal processors associated with processing a digital signal. In some implementations, Tx DSP 310 may receive a data source (e.g., a signal received via a Tx channel), may process the signal, and may output digital signals having symbols that represent components of the signal. In some implementations, Tx DSP 310 may be capable of mapping client data, associated with a client rate, to frames associated with a server rate (e.g., by including actual justifications in one or more of the frames in accordance with AMP, GMP, etc.). Additionally, or alternatively, Tx DSP 310 may be capable of creating intelligent artificial justifications associated with implementing a noise shaping technique (e.g., such that accuracy of a recovered client clock may be improved).

DAC 320 may include a signal converting device or a collection of signal converting devices. In some implementations, DAC 320 may receive respective digital signals from Tx DSP 310, may convert the received digital signals to analog signals, and may provide the analog signals to modulator 340. The analog signals may correspond to electrical signals (e.g., voltage signals) to drive modulator 340. In some implementations, optical transmitter 242 may include multiple DACs 320, where a particular DAC 320 may correspond to a particular polarization of a signal and/or a particular component of a signal.

Laser 330 may include a semiconductor laser, such as a distributed feedback (DFB) laser, or some other type of laser. Laser 330 may provide an output optical light beam to modulator 340.

Modulator 340 may include a Mach-Zehnder modulator (MZM), such as a nested MZM, or another type of modulator. Modulator 340 may receive the optical light beam from laser 330 and the voltage signals from DAC 320, and may modulate the optical light beam, based on the voltage signals, to generate a multiple sub-carrier output signal, which may be provided to multiplexer 244.

In some implementations, optical transmitter 242 may include multiple modulators 340, which may be used to modulate signals of different polarizations. For example, an optical splitter may receive an optical light beam from laser 330, and may split the optical light beam into two branches: one for a first polarization (e.g., an x-polarization) and one for a second polarization (e.g., the y-polarization). The splitter may output one optical light beam to a first modulator 340, which may be used to modulate signals of the first polarization, and another optical light beam to a second modulator 340, which may be used to modulate signals of the second polarization. In some implementations, two DACs 320 may be associated with each polarization. In these implementations, two DACs 320 may supply voltage signals to the first modulator 340 (e.g., for an in-phase component of the x-polarization and a quadrature component of the x-polarization), and two DACs 320 may supply voltage signals to the second modulator 340 (e.g., for an in-phase component of the y-polarization and a quadrature component of the y-polarization). The outputs of modulators 340 may be combined back together using combiners (e.g., optical multiplexer 244) and polarization multiplexing.

The number and arrangement of components shown in FIG. 3 are provided as an example. In practice, optical transmitter 242 may include additional components, fewer components, different components, or differently arranged components than those shown in FIG. 3. For example, the quantity of DACs 320, lasers 330, and/or modulators 340 may be selected to implement an optical transmitter 242 that is capable of generating polarization diverse signals for transmission on an optical fiber, such as link 250. Additionally, or alternatively, a set of components shown in FIG. 3 may perform one or more functions described herein as being performed by another set of components shown in FIG. 3.

Figure 4:
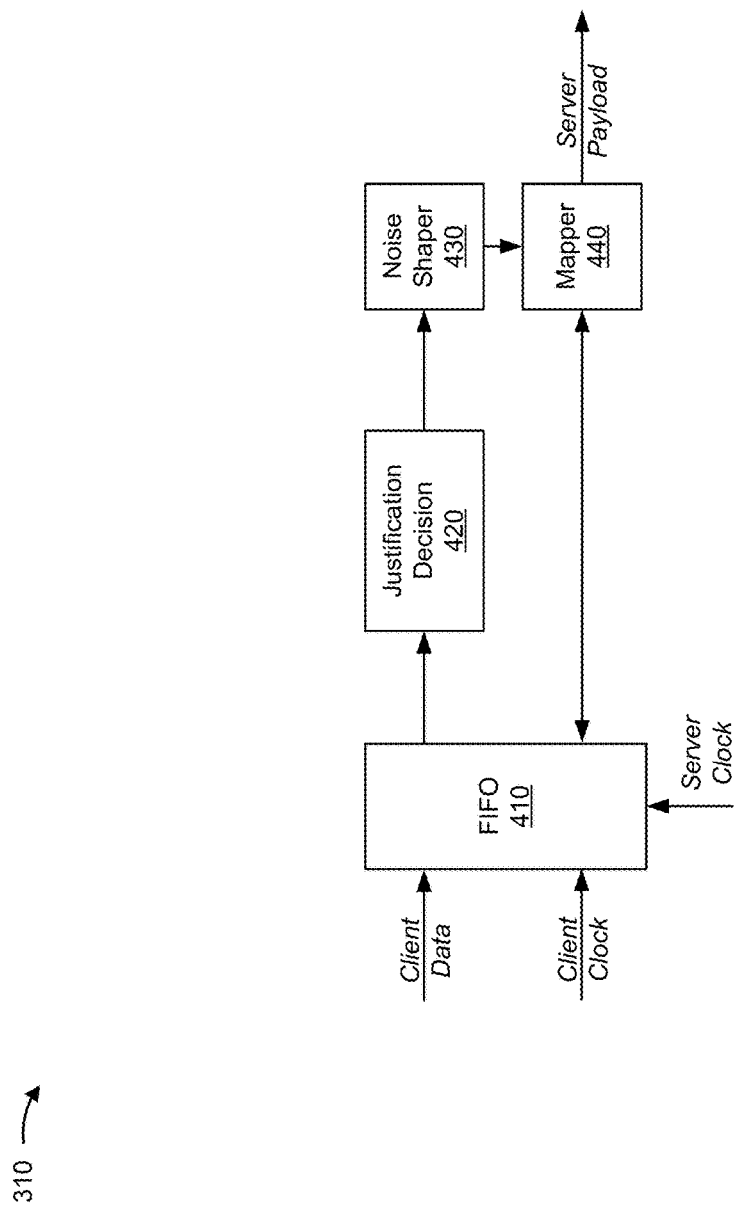
FIG. 4 is a diagram of example components of a transmitter digital signal processor of FIG. 3.

FIG. 4 is a diagram of example components of Tx DSP 310 as shown in FIG. 3. As shown in FIG. 4, Tx DSP 310 may include first in, first out component (FIFO) 410, justification decision component 420, noise shaper component 430, and mapper component 440.

FIFO 410 may include a memory component associated with receiving, buffering, and/or providing client data, associated with a client rate, such that the client data may be mapped to frames associated with a server rate. In some implementations, FIFO 410 may implement a queue processing technique on a first-come, first-served basis (e.g., such that first client data which is added to the queue will be first client data to be removed). In some implementations, FIFO 410 may be used for synchronization between the client rate and the server rate. In some implementations, FIFO 410 may use a client clock (e.g., associated with the client rate) to control write operations associated with client data stored in FIFO 410. Additionally, or alternatively, FIFO 410 may use a server clock (e.g., associated with the server rate) to control read operations associated with the client data stored in FIFO 410.

Justification decision component 420 may include a component configured to generate information associated with justifications (herein referred to as justification information) used to map the client data to frames. For example, justification decision component 420 may determine (e.g., based on depth information associated with an amount of client data stored by FIFO 410) whether a frame is to include a justification (e.g., a positive justification, a negative justification, etc.) when mapping client data to the frame. In some implementations, justification decision component 420 may be associated with an AMP and/or a GMP. In some implementations, justification decision component 420 may provide the justification information to noise shaper component 430 and/or mapper component 440.

Noise shaper component 430 may include a component associated with creating intelligent artificial justifications associated with implementing a noise shaping to phase variations (i.e., noise) in a recovered client clock (e.g., when mapping the client data based on the actual justifications causes the noise). For example, noise shaper 430 may create intelligent artificial justification information that results in additional noise being present in the recovered client clock such that quantization noise (e.g., an error introduced by quantizing a received signal in order to recover an original signal), associated with recovering the client clock, is spread and pushed to higher frequency region.

Figure 5:
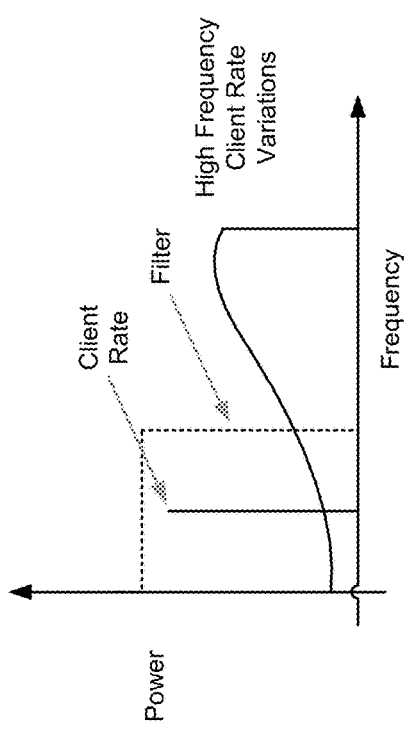
FIG. 5 is a diagram of an example showing a result of applying noise shaping to a signal.

Continuing this example, noise shaper 430 may also create the intelligent justifications such that a frequency of the noise (e.g., introduced by the intelligent artificial justifications and the actual justifications) is modified (e.g., increased) such that the noise may be filtered from the recovered client clock (e.g., the noise may be manipulated such that the frequency of the noise satisfies a filtering threshold). In this way, noise shaper component 430 may implement the noise shaping technique when creating the intelligent artificial justifications. FIG. 5 is a diagram of an example 500 showing a result of applying noise shaping to a signal associated with a client rate. As shown in FIG. 5, noise shaping may increase a signal to noise ratio associated with the signal by pushing the quantization noise such that the noise power is lower at frequencies where noise is more undesirable (e.g., where the noise may not be filterable) and higher at frequencies where noise is less undesirable (e.g., where the noise may be filterable).

By creating the intelligent artificial justifications in this manner, noise shaper 430 may cause phase variations associated with the recovered client clock (e.g., phase variations introduced by the actual justifications and the intelligent artificial justifications) that may be easily filtered (e.g., as compared to phase variations introduced by the actual justifications alone). In some implementations, noise shaper component 430 may create the intelligent artificial justifications based on the justification information provided by justification decision component 420. In some implementations, noise shaper component 430 may provide information associated with the intelligent artificial justifications (herein referred to as intelligent artificial justification information) to mapper component 440.

Figure 6:
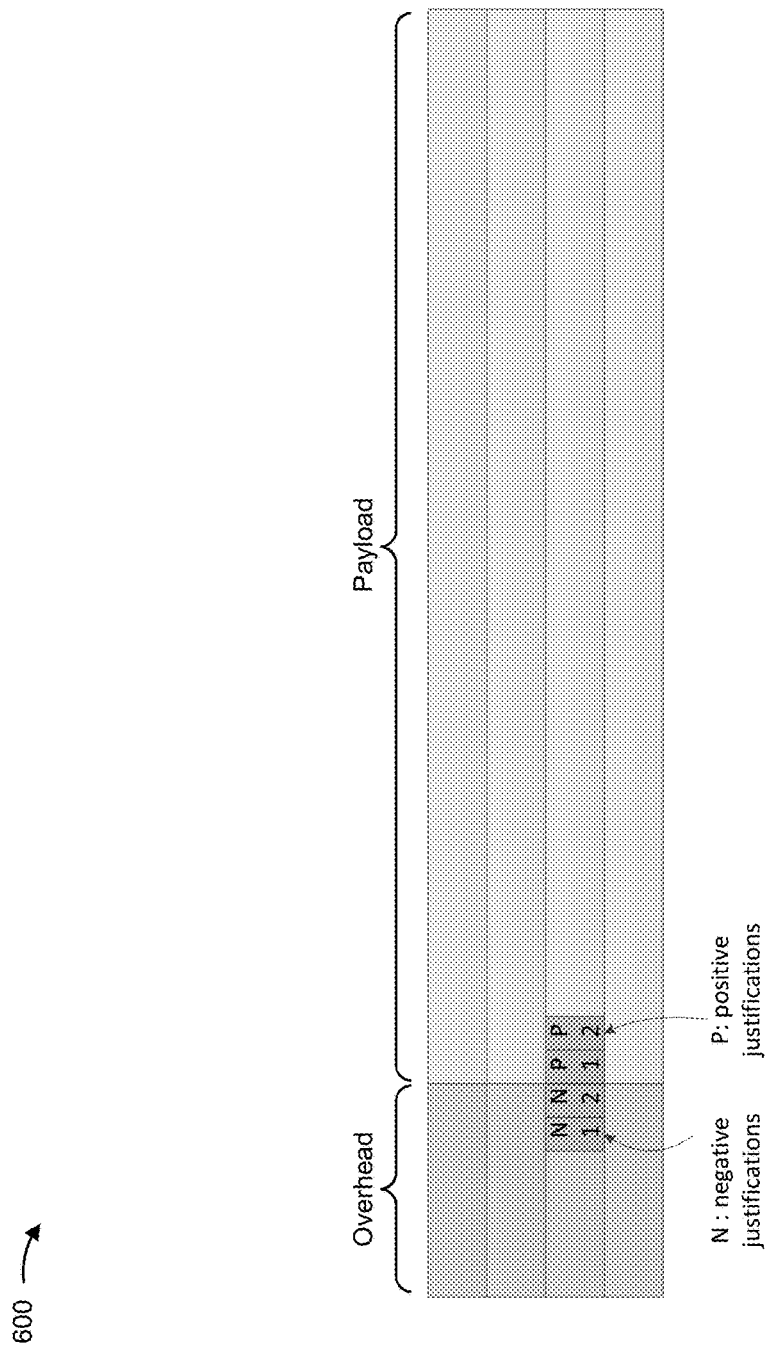
FIG. 6 is a diagram of an example frame that includes an overhead area, a payload area, and identifies example frame locations a set of positive justifications and a set of negative justifications.

Mapper component 440 may include a component configured to map the client data to server frames based on justification information and/or intelligent artificial justification information. For example, mapper component 440 may receive (e.g., from FIFO 410) client data to be mapped to a frame. Here, mapper component 440 may map the client data to a frame in accordance with justification information and/or intelligent artificial justification information (e.g., such that the frame includes one or more positive or negative actual justifications and/or intelligent artificial justifications). FIG. 6 is a diagram of an example frame 600 that includes an overhead area, a payload area, and identifies example locations of a set of positive justifications and a set of negative justifications associated with mapping client data to a frame. As shown in FIG. 6, in some implementations, mapper 440 may map the client data to the payload area, a location in the payload area designated for one or more positive justifications, and/or a location in the overhead area designated for one or more negative justifications. In some implementations, mapper component 440 may provide the frame such that another device (e.g., optical receiver 273) may receive the frame, demap the client data, recover the client clock (e.g., including filtering phase variations introduced by the actual justifications and/or intelligent artificial justifications), and/or determine the client rate.

While FIG. 4 shows Tx DSP 310 as including a particular quantity and arrangement of components, in some implementations, Tx DSP 310 may include additional components, fewer components, different components, or differently arranged components.

FIG. 7 is a flow chart of an example process 700 for creating intelligent artificial justifications in order to apply noise shaping to actual justifications associated with mapping client data, associated with a client rate, to frames associated with a server rate. In some implementations, one or more process blocks of FIG. 7 may be performed by one or more components of Tx DSP 310. In some implementations, one or more process blocks of FIG. 7 may be performed by another component or a set of components separate from or including the one or more components of Tx DSP 310, such as one or more other components of optical transmitter 242.

As shown in FIG. 7, process 700 may include receiving client data, associated with a client rate, that is to be mapped to frames associated with a server rate (block 710). For example, Tx DSP 310 (e.g., FIFO 410) may receive client data, associated with a client rate, that is to be mapped to frames associated with a server rate. In some implementations, Tx DSP 310 may receive with the client data (e.g., a stream of client data) when another device (e.g., another device in optical network 200, such as an optical receiver, a client device, etc.) provides the client data.

In some implementations, Tx DSP 310 may receive the client data as unmapped client data associated with a client rate. For example, Tx DSP 310 may receive unmapped client data associated with a 40 GbE client rate. Additionally, or alternatively, Tx DSP 310 may receive client data, associated with a client rate, that has been mapped into frames associated with a server rate. For example, Tx DSP 310 may receive 40 GbE client data that has been mapped into OTN frames associated with an OPU3 rate. Here, Tx DSP 310 may receive the mapped client data, and a demapper component of Tx DSP 310 may demap the mapped client data to recover the client rate. In other words, in some implementations, Tx DSP 310 may recover the client rate such that Tx DSP 310 may map the client data to another server rate. In some implementations, Tx DSP 310 may receive the client data, and may store the client data in FIFO 410 (e.g., such that FIFO 410 may provide the client data to mapper component 440 at a later time).

As further shown in FIG. 7, process 700 may include determining depth information associated with mapping the client data to the frame (block 720). For example, Tx DSP 310 (e.g., justification decision component 420) may determine depth information associated with mapping the client data to the frames. In some implementations, Tx DSP 310 may determine the depth information after Tx DSP 310 receives the client data. Additionally, or alternatively, Tx DSP 310 may determine the depth information when Tx DSP 310 receives an indication (e.g., associated with the server clock) that Tx DSP 310 is to create and send a frame associated with the server rate.

The depth information may include information associated with a quantity of client data (e.g., a quantity of bits, a quantity of bytes, etc.) stored by FIFO 410 (e.g., client data that has yet to be mapped to a frame). In some implementations, the depth information may include information that identifies an average quantity of data stored by FIFO 410 (i.e., a bit depth) during a period of time (e.g., an average quantity of bits stored by FIFO 410 over a five millisecond (ms) period of time, a 100 ms period of time, etc.). Additionally, or alternatively, the depth information may include information that identifies a quantity of data stored by FIFO 410 at a given time. In some implementations, the depth information may be used by Tx DSP 310 to generate justification information associated with mapping the client data to the frames, as described below.

As further shown in FIG. 7, process 700 may include generating justification information, associated with mapping the client data to the frame, based on the depth information (block 730). For example, Tx DSP 310 (e.g., justification decision component 420) may generate justification information, associated with mapping the client rate to the frame, based on the depth information. In some implementations, Tx DSP 310 may generate the justification information after Tx DSP 310 receives the depth information. Additionally, or alternatively, Tx DSP 310 may generate the justification information when Tx DSP 310 receives the indication (e.g., associated with the server clock) that Tx DSP 310 is to create and send a frame associated with the server rate.

In some implementations, Tx DSP 310 may generate the justification information based on the depth information. For example, Tx DSP 310 may determine depth information that includes a set of average bit depths for a corresponding set of time periods. Here, if Tx DSP 310 determines that the average bit depth is decreasing, then Tx DSP 310 may determine that the server rate is faster than the client rate. In this case, Tx DSP 310 may generate (e.g., based on a quantity of client data stored by FIFO 410) justification information for a negative justification (e.g., since the server rate is faster than the client rate). Alternatively, if Tx DSP 310 determines that the average bit depth is increasing, then Tx DSP 310 may determine that the client rate is faster than the server rate. In this case, Tx DSP 310 may generate justification information for a positive justification (e.g., since the client rate is faster than the server rate).

In some implementations, Tx DSP 310 may generate justification information that identifies an amount of data associated with the justification. For example, Tx DSP 310 may determine, based on a quantity of client data stored by FIFO 410, justification information that identifies a justification (e.g., a positive justification or a negative justification) of one or more bits and/or one or more bytes. In some implementations, Tx DSP 310 may generate justification information for one or more frames that are to carry server payloads in which the client data is to be mapped. Additionally, or alternatively, Tx DSP 310 may generate justification information indicating that no justification is to be applied when mapping the client data to the frame.

As further shown in FIG. 7, process 700 may include creating intelligent artificial justification information based on the justification information (block 740). For example, Tx DSP 310 (e.g., noise shaper component 430) may create intelligent artificial justification information based on the justification information. In some implementations, Tx DSP 310 may create the intelligent artificial justification information after Tx DSP 310 generates the justification information. Additionally, or alternatively, Tx DSP 310 may create the intelligent artificial justification information when Tx DSP 310 receives the indication (e.g., associated with the server clock) that Tx DSP 310 is to create and send a frame associated with the server rate.

In some implementations, the intelligent artificial justification information may include information associated with one or more justifications created to shape noise in a recovered client clock caused by actual justifications. For example, the intelligent artificial justification information may include justifications created to shape phase variations caused by the actual justifications in a recovered client clock. Here, a frequency spectrum, associated with the phase variations, may be shaped based on the artificial justifications to create shaped phase variations. In some implementations, Tx DSP 310 may create the intelligent artificial justification information based on the justification information. For example, Tx DSP 310 may generate justification information for a set of justifications associated with a corresponding set of frames. Here, Tx DSP 310 may create (e.g., based on a frame in which a justification was applied, based on a quantity of data associated with the justification, based on whether the justification is a positive justification or a negative justification, etc.) intelligent artificial justification information for a set of justifications associated with shaping noise introduced by the actual justifications included in the justification information. In other words, the intelligent artificial justification information may be intelligently created based on the justification information (i.e., the artificial justification information may not be randomly created, the artificial justification information may be determined in response to the actual justification information, etc.). In some implementations, the intelligent artificial justification information may be referred to as artificial justification information. Similarly, an intelligent artificial justification may be referred to as an artificial justification.

In some implementations, the intelligent artificial justification information may describe a positive intelligent artificial justification or a negative artificial justification. Additionally, or alternatively, the intelligent artificial justification information may identify an intelligent artificial justification of one or more bits and/or one or more bytes. In some implementations, Tx DSP 310 may create intelligent artificial justification information for one or more frames.

In some implementations, Tx DSP 310 may create the intelligent artificial justification information such that an average justification rate, associated with the justification information, may be maintained. For example, if the justification information includes actual justifications at an average justification rate (e.g., two negative one byte justifications over 100 frames, three positive one byte justifications over 50 frames, etc.), then Tx DSP 310 may create the intelligent artificial justification information such that the intelligent artificial justifications alter the sequence of the actual justifications while maintaining the average justification rate (i.e., such that the average justification rate unchanged). As a particular example, assume that actual justifications over a set of 15 frames are 0, 0, +1, 0, 0, +1, 0, 0, −1, 0, 0, +1, 0, 0, and −1 (e.g., where 0 represents no justification, −1 represents a negative one byte justification, and +1 represents a positive one byte justification). Here, the average justification rate is three positive justifications over the 15 frames (e.g., (1+1-1+1-1)/15=3 justifications/15 frames). In this example, then Tx DSP 310 may create the intelligent artificial justification information such that the average justification rate over remains at three positive justifications over the 15 frames. For example, Tx DSP 310 may create intelligent artificial justifications over the set of 15 frames as follows: −2, +1, 0, −1, +2, 0, +1, +2, +1, −1, 0, 0, +1, −2, and +1. Here, the intelligent artificial justification the average justification rate is also three positive justifications over the 15 frames (e.g., (−2+1-1+2+1+2+1-1+1-2+1)/15=3 justifications/15 frames). In this way, the intelligent artificial justification information may be created in order to maintain the average justification rate.

In some implementations, the intelligent artificial justifications, when added to corresponding frames, may cause higher frequency phase variations (e.g., as compared to phase variations caused by the actual justifications alone), such that the phase variations may be filtered out of a client clock (e.g., recovered based on the frame). In other words, the phase variations, caused by the intelligent artificial justifications, may satisfy a threshold associated with filtering the phase variations (e.g., where phase variations that satisfy the threshold may be filtered and phase variations that do not satisfy the threshold may not be filtered). In this way, Tx DSP 310 may create intelligent artificial justifications to apply noise shaping and/or dither techniques to noise introduced by actual justifications associated with mapping the client data to the frames.

As further shown in FIG. 7, process 700 may include providing the intelligent artificial justification information (block 750). For example, Tx DSP 310 (e.g., noise shaper component 430) may provide the intelligent artificial justification information. In some implementations, Tx DSP 310 may provide the intelligent artificial justification information after Tx DSP 310 creates the intelligent artificial justification information.

In some implementations, Tx DSP 310 may provide the intelligent artificial justification information to mapper component 440 of Tx DSP 310. Additionally, or alternatively, Tx DSP 310 may also provide the justification information to mapper component 440. In some implementations, mapper component 440 may receive the justification information and the artificial justification, and may map client data (e.g., received from FIFO 410) to one or more frames based on the justification information and the intelligent artificial justification (e.g., such that the one or more frames include actual justifications and/or intelligent artificial justifications). In some implementations, mapper component 440 may include the intelligent artificial justifications in the frames in a manner similar to that which mapper component 440 may include the actual justifications (e.g., by indicating that a frame includes a justification by modifying a JCO byte, etc.).

In some implementations, after the client data is mapped to the frames, the frame may be provided at the server rate. Here, due to the inclusion of the intelligent artificial justifications, phase variations of a recovered client clock may be filterable such that an amount of jitter and/or wander in the recovered client clock may be removed (e.g., such that accuracy of a recovered client rate is improved).

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8A:
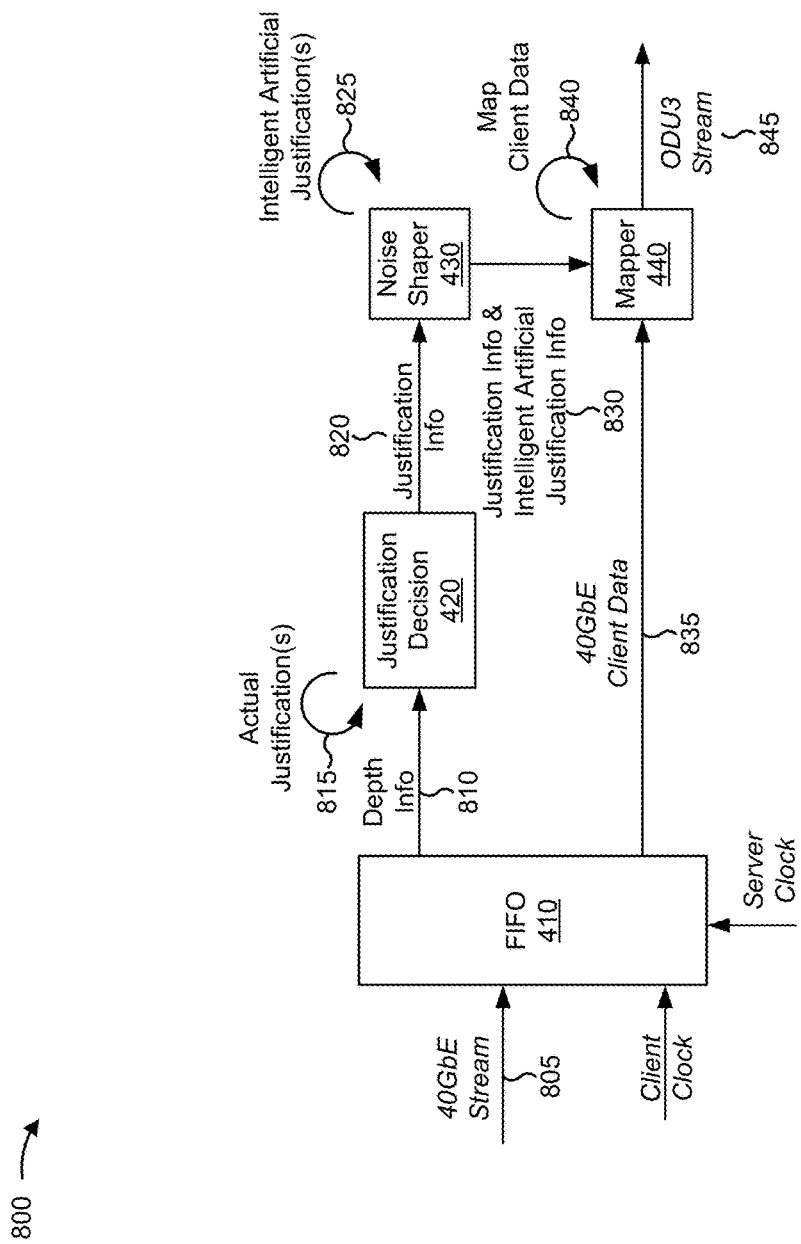
FIGS. 8A and 8B are diagrams of an example implementation relating to the example process shown in FIG. 7.
Figure 8B:
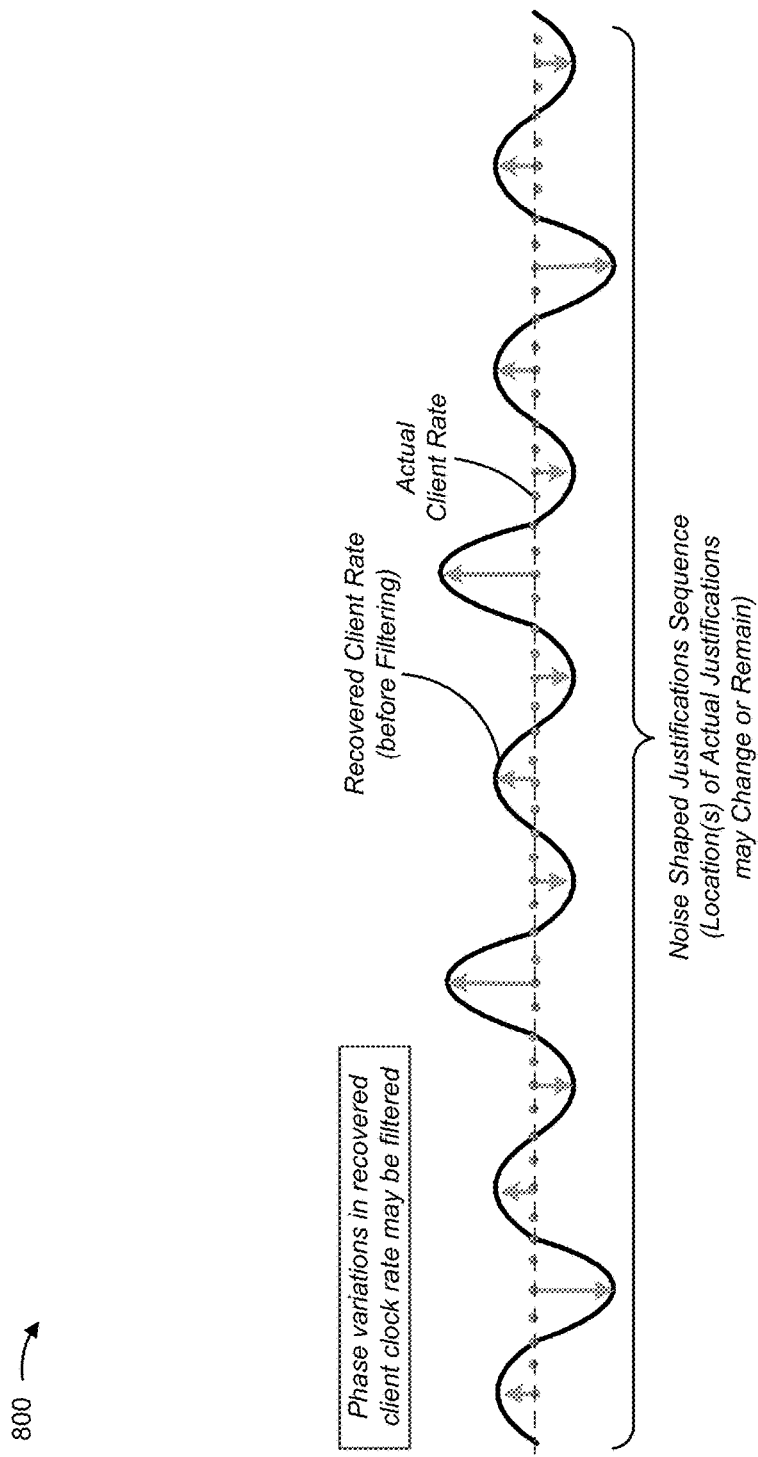

FIGS. 8A and 8B are diagrams of an example implementation 800 relating to example process 700 shown in FIG. 7. For the purposes of example implementation 800, assume that client data, associated with a client rate (e.g., a 40 GbE client data stream), is to be mapped to frames associated with a server rate (e.g., OPU3), and provided (e.g., via an OPU3 stream). Further, assume that an asynchronous mapping technique is to be used to generate justifications associated with adapting the client rate to the server rate, and that intelligent artificial justifications are to be used to apply noise shaping techniques to noise introduced by the justifications.

As shown in FIG. 8A, and by reference number 805, FIFO 410 may receive, buffer, and/or store the client data associated with the client rate. As shown by reference number 810, FIFO 410 may (e.g., periodically, such as once per frame, once per two frames) provide depth information, associated with a quantity of client data stored by FIFO 410, to justification decision component 420. As shown by reference number 815, justification decision component 420 may generate justification information that identifies one or more actual justifications associated with mapping the client data to the frames. As shown by reference 820, justification decision component 420 may provide the justification information to noise shaper component 430. As shown by reference number 825, noise shaper component 430 may create, based on the justification information, intelligent artificial justifications used to apply noise shaping and/or dithering techniques to noise that may be introduced by the actual justifications. As shown by reference number 830, noise shaper component 430 may provide the justification information and the intelligent artificial justification information to mapper component 440. As shown by reference number 835, FIFO 410 may provide, to mapper component 440, client data that is to be mapped into one or more frames. As shown by reference number 840, mapper component 440 may map (e.g., based on the justification information and/or the intelligent artificial justification information) the client data to the frames. As shown by reference number 845, mapper component 440 may provide the frames such that the frames may be provided at the server rate.

FIG. 8B shows an example approximation of how the recovered client rate may oscillate around the actual client rate based on adding the intelligent artificial justifications when mapping the client data into the frames. As shown, before filtering (e.g., at optical receiver 273) of the higher frequency phase variations, the recovered client rate may oscillate more frequently due to the intelligent artificial justifications. However, higher frequency phase variations that cause this oscillation may be easily filtered (e.g., in a phase-locked loop (PLL)) such that accuracy of the recovered client clock is improved. Here, use of intelligent artificial justifications to noise shape noise introduced by the actual justifications may allow the recovered client rate to be approximately equal to the actual client rate.

As indicated above, FIGS. 8A and 8B are provided merely as an example. Other examples are possible and may differ from what was described with regard to FIGS. 8A and 8B.

Implementations described herein may allow noise (e.g., phase variations) justifications, used to map client data (e.g., associated with a client rate) into frames (e.g., associated with a server rate), to be noise shaped such that the phase variations of a recovered client clock may be filtered in order to reduce an amount of jitter and/or wander in the recovered client clock (e.g., to improve accuracy of a recovered client rate).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical transmitter, comprising:
one or more components configured to:
receive client data, associated with a client rate, to be mapped to frames associated with a server rate;
generate justification information associated with the mapping of the client data to the frames,
the justification information including information associated with one or more justifications;
create artificial justifications based on the justification information,
modifying a frequency of noise present in a recovered client clock associated with the client rate based on the artificial justifications,
filtering the noise from the recovered client clock; and
map the client data to the frames based on the artificial justifications.

2. The optical transmitter of claim 1, where the client data is mapped to the frames using an asynchronous mapping procedure (AMP) or a generic mapping procedure (GMP).

3. The optical transmitter of claim 1, where the one or more components are configured to:
identify a quantity of data associated with a justification of the justifications; and
where the one or more components, when creating the artificial justifications, are configured to:
create the artificial justifications based on the quantity of data associated with the justification.

4. The optical transmitter of claim 1, where the one or more components are further configured to:
identify whether a justification, of the justifications, is a positive justification or a negative justification; and
where the one or more components, when creating the artificial justifications, are configured to:
create the artificial justifications based on whether the justification is a positive justification or a negative justification.

5. The optical transmitter of claim 1, where the frames are optical transport network (OTN) frames.

6. The optical transmitter of claim 1, where the artificial justifications include at least one of:
a positive artificial justification;
a negative artificial justification; or
an artificial justification of one or more bytes.

7. A system comprising,
a transmitter configured to:
receive client data, associated with a client rate, to be mapped to frames associated with a server rate;
generate information associated with the mapping of the client data to the frames,
the justification information including information associated with one or more justifications;
create artificial justifications based on the justification information,
modify a frequency of noise present in a recovered client clock associated with the client rate based on the artificial justifications,
filter the noise from the recovered client clock
map the client data to the frames based on the artificial justifications.

8. The system of claim 7, where the client data is mapped to the frames using an asynchronous mapping procedure (AMP) or a generic mapping procedure (GMP).

9. A system comprising,
a transmitter configured to:
receive client data, associated with a client rate, to be mapped to frames associated with a server rate;
generate justification information associated with the mapping of the client data to the frames,
the justification information including information associated with one or more justifications;
create artificial justifications based on the justification information,
the artificial justifications including information associated with a set of justifications created to shape phase variations present in a recovered client clock,
the recovered client clock being associated with the client rate, and
the phase variations having an associated frequency spectrum that is shaped based on the artificial justifications; and
map the client data to the frames based on the artificial justifications to cause shaped phase variations to be present in the recovered client clock,
the shaped phase variations including phase variations that can be filtered from the recovered client clock,
where the transmitter is configured to:
determine a first average justification rate associated with the justifications; and
where the transmitter, when creating the artificial justifications, is configured to:
create the artificial justifications such that a second average justification rate is approximately equal to the first average justification rate,
the second average justification rate being associated with the artificial justifications.

10. The system of claim 7, where the transmitter is configured to:
identify whether at least one justification, of the justifications, is a positive justification or a negative justification; and
where the transmitter, when creating the artificial justifications, is configured to:
create the artificial justifications based on whether the at least one justification is a positive justification or a negative justification.

11. The system of claim 7, where the frames are optical transport network (OTN) frames.

12. The system of claim 7, where the transmitter, after mapping the client data to the frames, is configured to provide the frames at the server rate.

13. The system of claim 7, where the artificial justifications include at least one of:
a positive artificial justification;
a negative artificial justification; or
an artificial justification of bytes.

14. A method, comprising:
receiving, by a digital signal processor (DSP), client data, associated with a client rate, to be mapped to frames associated with a server rate;
creating, by the DSP, a set of artificial justifications based on justification information including information associated with one or more justifications,
modifying by the DSP a frequency of noise present in a recovered client clock associated with the client rate based on the artificial justifications,
filtering by the DSP the noise from the recovered client clock; and
mapping, by the DSP, the client data to the frames based on the set of artificial justifications.

15. The method of claim 14, where the client data is mapped to the frames using an asynchronous mapping procedure (AMP) or a generic mapping procedure (GMP).

16. The method of claim 14, further comprising:
identifying a quantity of data associated with at least one actual justification of the set of actual justifications; and
where creating the set of artificial justifications comprises:
creating the set of artificial justifications based on the quantity of data associated with the at least one actual justification.

17. The method of claim 14, further comprising:
identifying whether at least one actual justification, of the set of actual justifications, is a positive justification or a negative justification; and
where creating the set of artificial justifications comprises:
creating the set of artificial justifications based on whether the at least one actual justification is a positive justification or a negative justification.

18. The method of claim 14, where the frames are optical transport network (OTN) frames.

19. The method of claim 14, where the set of artificial justifications includes at least one of:
a positive artificial justification;
a negative artificial justification; or
an artificial justification of one or more bytes.

* * * * *